United States Patent [19]

Blankmeiser et al.

[11] Patent Number: 5,341,966
[45] Date of Patent: Aug. 30, 1994

[54] CELLULAR WHEEL SLUICE FOR PRESSURE VESSELS

[75] Inventors: Wilhelm Blankmeiser, Essen; Peter Spuerck, Bruehl, both of Fed. Rep. of Germany

[73] Assignee: Kloeckner-Humboldt-Deutz AG, Cologne, Fed. Rep. of Germany

[21] Appl. No.: 988,978

[22] Filed: Dec. 10, 1992

[51] Int. Cl.$^5$ .............................................. G01F 11/00
[52] U.S. Cl. .................................... 222/370; 277/59; 277/105
[58] Field of Search ............... 222/370; 414/217, 219, 414/220; 277/102, 105, 59, 71, 70

[56] References Cited

U.S. PATENT DOCUMENTS

| | | | |
|---|---|---|---|
| 2,680,683 | 6/1954 | Obenshain | 414/217 X |
| 2,706,148 | 4/1955 | Knapp | 414/217 X |
| 2,933,208 | 4/1960 | Green | 414/220 |
| 3,076,580 | 2/1963 | Heath | 222/370 X |
| 3,224,606 | 12/1965 | Schnyder | 414/217 |
| 3,251,511 | 5/1966 | Lloyd | 222/370 X |
| 4,180,188 | 12/1979 | Aonuma et al. | 414/219 X |
| 4,204,689 | 5/1980 | Johansson | 277/59 X |
| 4,632,402 | 12/1986 | Daeyaert | 277/59 X |
| 4,936,592 | 6/1990 | Väisänen | 277/105 X |
| 4,946,078 | 8/1990 | Heep et al. | 414/220 X |
| 5,076,501 | 12/1991 | Tschumi | 222/370 X |

*Primary Examiner*—Andres Kashnikow
*Assistant Examiner*—Anthoula Pomrening
*Attorney, Agent, or Firm*—Hill, Steadman & Simpson

[57] ABSTRACT

A cellular rotary sluice for discharging material from a pressure vessel including a cell housing rotatable about a vertical axis with top and bottom stationary sealing plates and rotatable inner and outer vertical edge members with the edge members provided with wear facing at a top and bottom edge and with wear inserts in the top and bottom plates, a seal outside of the wear locations formed either by a packing seal within a ring or an O-ring, and in one form a space which is pressurized preventing the passing of material into and past the wear locations.

11 Claims, 2 Drawing Sheets

CELLULAR WHEEL SLUICE FOR PRESSURE VESSELS

BACKGROUND OF THE INVENTION

The invention relates to improvements in mechanisms for discharging material from pressure vessels. More particularly, the invention relates to a cellular wheel sluice for discharging solid or liquid material from a pressure vessel while reducing the pressure within the sluice.

In the foregoing type of apparatus for discharging material from a pressure vessel, one form of mechanism utilizes a housing with cells which are rotationally movable about a vertical axis with the cells being partially open. Means are provided for admitting material from the pressure vessel into the cells and means are provided for discharging the material from the cells. In the form involved in the present invention, a plurality of open cells rotatable about a vertical axis are covered at the top by a top sealing plate and at the bottom by a bottom sealing plate. The top sealing plate has a material admission opening. The bottom sealing plate has a material discharge opening offset with respect to the admission opening.

Material sluices for the transfer of solids and liquid material from a pressure vessel are conventionally known as cellular wheel sluices having a vertical axis. Such general arrangement is shown, for example, in German Published Application 33 35 860 which discloses such a sluice.

The cellular wheel housing glides between two sealing plates and an opening through which the material enters the cell from the pressure vessel is located in the top sealing plate. When the cell housing turns, the pressure is relieved in the cell and the material passes to the outside through an opening in the lower plate which is offset from the admission opening in the upper plate.

In this apparatus because the equipment is dealing with pressures and is in an environment of room pressure, the mechanism requires relatively expensive equipment with a technological outlay because of the wear that occurs. There is an air gap between the rotating cellular wheel housing and the top and bottom sealing plates because of occurring wear which proceeds with use. Material is expressed toward the outside through the air gap with a high flow rate if wear causes a gap. This is a consequence of the high pressure prevailing in the cellular wheel housing versus the room pressure on the outside of the housing.

Additional wear is caused by the equipment handling abrasive materials. As a result of the tightness of the cellular wheel sluice, this tightness decreases to an extent in a short time so that the sealing effect of the pressure vessel is lost. Mechanical readjustment of the sealing plates and a reduction in the size of the air gap between the plates and cell housing has been one of the solutions such as suggested in German Published Application 33 35 860 and the air gap is thus prevented from becoming constantly larger due to wear.

It is accordingly an object of the present invention to provide a cellular wheel sluice which avoids the disadvantages of structures of the prior art and wherein a simplified structure is utilized to guarantee the retention of tightness of the cellular wheel housing and with constant use, minimizes wear. A further object of the invention is to provide an improved cellular wheel sluice with unique sealing arrangements which coact with apparatus which prevents wear so that wear is reduced and the retention and maintenance of a tight seal is assured.

FEATURES OF THE INVENTION

In the inventive arrangement, wear resistant materials are located at the air gaps between the edges of the cell housing and the top and bottom sealing plates and these are arranged so that the air gap does not enlarge over a longer time span. The wear resistant materials, preferably hard metals or ceramic material, are secured to the outer edges of the shell housing by build-up welding or cementing. They also can be releasably connected to the edge in one form of structure.

The invention further contemplates introducing wear resistant materials into the sealing plates. These wear resistant materials slide on one another during operation of the cellular wheel sluice in the regions subject to wear. Combinations that have both a high resistance to wear as well as a low coefficient of friction are provided on the basis of an intentional selection of the materials.

With the provisions of the foregoing, however, wear cannot be completely avoided. In order to minimize wear caused by the expressed material, uniquely arranged seal elements are located to prevent an outflow of the pressurized medium from the interior of the cells. This also prevents an extrusion or expression of the material.

It is also further contemplated that a fluid blocking medium can be additionally supplied into the interspaces between the seal elements and the sealing plates with a pressure higher than that corresponding to the interior pressure of the cells. This additionally makes it more difficult for the pressure medium to flow out from the interiors of the cells.

Other objects, advantages and features as well as equivalent structures which are intended to be covered herein will become more apparent with the teaching of the principles of the invention in connection with the disclosure of the preferred embodiments in the specification, claims and drawings, in which:

DESCRIPTION OF THE PREFERRED EMBODIMENTS

Figure 1:
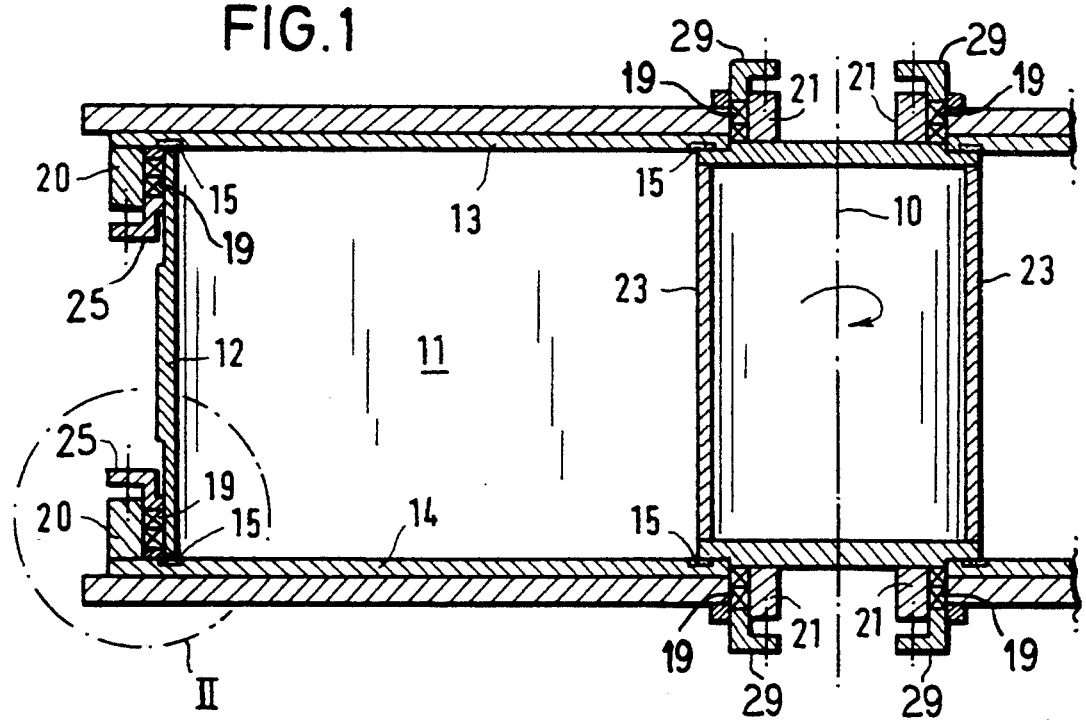
FIG. 1 is a vertical sectional view taken through a cellular rotary sluice embodying the principles of the present invention.
Figures 2, 3:
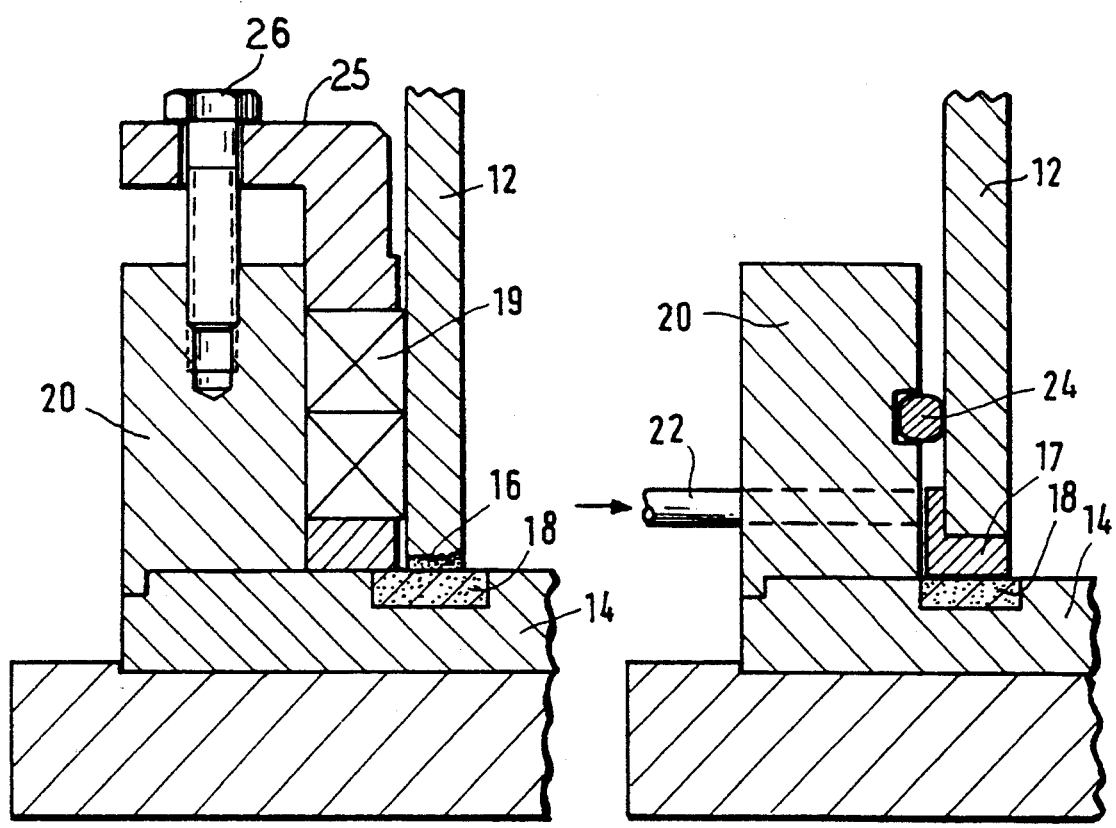
FIG. 2 is an enlarged detailed fragmentary view taken at the location indicated at II in FIG. 1.
FIG. 3 is an enlarged detailed fragmentary sectional view similar to FIG. 2 and illustrating another form of the invention.
Figure 4:
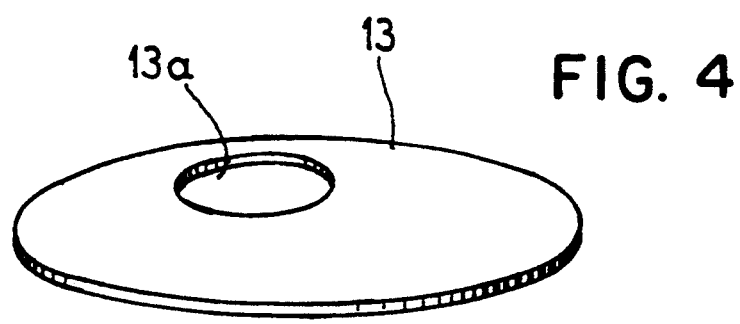
FIG. 4 is a fragmentary perspective view of a portion of the mechanism.
Figure 5:
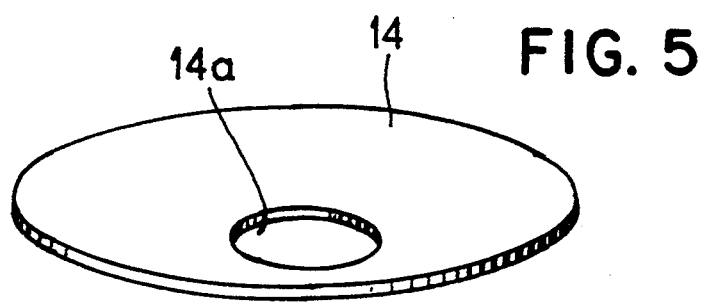
FIG. 5 is another perspective view of a portion of the mechanism.

As illustrated in FIG. 1, a cellular wheel sluice is shown having a vertical axis 10 around which the cell housing 11 rotates. The housing includes an outer vertical edge member 12 and inner vertical edge members 23 which rotate. The cell housing is closed off from the surrounding atmosphere by a stationary top sealing plate 13 and a stationary bottom sealing plate 14. The top plates have an admission opening 13a, FIG. 3, and the bottom plate has a discharge opening 14a, FIG. 4, circumferentially offset from the opening 13a. The cell housing area 11, when it is pressurized by material from a pressure vessel, is basically sealed and the pressure medium can escape only at the places where there is relative movement and air gaps 15. As will later become clear at the air gaps 15, are unique wearing elements and outside of the air gaps are seals. As shown in FIGS. 2 and 3 in more detail, the vertical edge members 12 and 23 of the cell housing have their ends provided with wear resistant materials as shown in 16 in FIG. 2 and with a special wear resistant ring 17 in FIG. 3. In FIG. 2, the wear resistant materials 16 can be constructed as a matter of build up welding of hard metal or, as shown in FIG. 3, the wear resistant material which is connected to the edges 12 and 23 of the cell, are rings 17 or annular segments of rings which may be of a wear resistant metal or of a ceramic material. Further wear resistant materials 18, in both the modifications of FIGS. 2 and 3 are embedded for protection against wear at the locations of the wear materials 16 and 17. Thus, wear is prevented by the wear resistant material 16 or the wear resistant ring 17 sliding against the insert 18. The inserts 18 are carried in both a top stationary sealing plate 13 and a bottom stationary sealing plate 14. With low coefficients of friction, the wear of materials sliding on one another can be largely minimized by an appropriate combination of wear resistant materials relative to one another. It will be understood that the construction shown in detail in FIGS. 2 and 3 exists at each of the top and bottom edges of the vertical edge member 12 and at the top and bottom edges of the vertical edge member 23.

Outside of the sliding juncture of the wear resistant elements 16 and 18, for the top and bottom of the outer sealing plate, are seal elements 19. An outer stationary ring 20 is positioned onto the top sealing plate 13 and the bottom sealing plate 14 leaving a small space outside of the outer vertical edge member and in that space is the seal element 19. The seal element in FIG. 2 is fashioned as a stuffing box with a retaining ring adjustably pressing down on the seals 19 by a bolt 26 such as threaded into the outer ring 20. The same arrangement is provided at the top of the outer vertical edge member 12 with the flexible seals shown at 19 held in place by the ring 25.

For the inner vertical edge members 23, upper and lower rings 21 are provided leaving a space for flexible seals 19. These seals are held in place by retaining rings 29 similar to the arrangement shown in FIG. 2.

As illustrated in FIG. 3, a seal arrangement is employed utilizing an O-ring 24. This arrangement again will be employed both at the top and bottom of the outer vertical edge member 12 and the top and bottom of the inner vertical edge members 23. In this arrangement, the outer ring 20 is provided with a groove to hold the O-ring 24 leaving a space between the O-ring and the edge of the plate 12. A pressure line 22 opens into the space between the seal 24 and the bottom edge of the plate 12 so that this space can be pressurized to act as a blocking agent. This pressurizing of this area not only provides for a seal preventing the emission of pressurized material from within the cell but keeps material from being extruded into the space between the wear elements. That is, material from within the cell will be kept from passing between the wear ring 17 and the wear insert 18. This will substantially prevent any emergence of the material from the cell even if the air gap designated at 15 becomes enlarged due to wear with the passage of time and much use.

In operation, material is admitted into the space 11 of the cell by the admission opening 13a, FIG. 3, in the top sealing plate 13. The cell rotates and material is discharged through the appropriate opening 14a, FIG. 4, in the bottom sealing plate 14. With the relative rotation between the inner and outer vertical edge members 23 and 12, there is sliding movement at 15 and wear is greatly inhibited by the wear sustaining facing substance 16 at the lower edge of the edge member 12 and by the wear preventing insert 18 in the lower plate. Similarly, wear is prevented at the other locations at 15. The escape of pressure or material from the cell is prevented by packing seals 19 held in place by a ring 25 and seals 19 held in place by a ring 29. In another embodiment, the O-ring seal 24 outside of the wear location 15 forms a small space which is pressurized by a pressure line 22 with the pressure either being maintained at the pressure of material inside the cell or slightly greater so that not only is the escape of pressure and material prevented but the material is prevented from passing into the wear space 15. This is especially useful where abrasive materials are being handled and discharged from a pressure vessel.

Thus, it will be seen we have provided an improved cellular wheel sluice structure which meets the objects and objectives above set forth and in a simplified improved structure, provides for a long wearing unit as well as a unit which does not tolerate the leakage of material being handled.

We claim as our invention:

1. A cellular rotary sluice for discharging material from a pressure vessel while reducing pressure with the sluice comprising in combination:

a cell housing rotatable about a vertical axis and having partially opened cells;

top and bottom sealing plates covering cells in the housing and arranged for providing a material admission opening in the top plate and a material discharge opening in the bottom plate offset from the admission opening;

a vertical inner edge member of the housing in sealing relationship at an upper edge and at a lower edge with the top plate and the bottom plate at an inner edge of the plates;

an outer vertical edge member of the housing in sealing relationship at an upper and a lower edge with the top and bottom plates at an outer edge thereof;

an inner ring at the inner edge of the top plate and at the inner edge of the bottom plate;

an outer ring at the outer edge of the top plate and at the outer edge of the bottom plate;

a first inner seal element between said inner ring and said top plate;

a second inner seal element between said inner ring and said bottom plate;

a first outer seal element between said outer ring and said vertical outer edge member adjacent said top plate;

and a second outer seal element between said outer ring and said vertical outer edge member adjacent said bottom plate so that relative rotation can occur between the plates and vertical edge members preventing the escape of material from the housing between the plates and the vertical edge members.

2. A cellular rotary sluice for discharging material from a pressure vessel while reducing pressure within the sluice constructed in accordance with claim 1:
including wear resistant materials joined to the upper and lower edges of said inner vertical edge member and at the upper and lower edges of said outer vertical edge member.

3. A cellular rotary sluice for discharging material from a pressure vessel while reducing pressure within the sluice constructed in accordance with claim 1:
including wear resistant material embedded in each of the sealing plates at the upper and lower edges of the inner vertical edge member and at the upper and lower edges of the outer vertical edge member.

4. A cellular rotary sluice for discharging material from a pressure vessel while reducing pressure within the sluice constructed in accordance with claim 1:
the second outer seal element including an o-ring sealing element at the lower edge of the outer vertical edge member.

5. A cellular rotary sluice for discharging material from a pressure vessel while reducing pressure within the sluice constructed in accordance with claim 1:
including stuffing box seal elements located at the top and bottom of said outer vertical edge member between the outer vertical edge member and outer rings.

6. A cellular rotary sluice for discharging material from a pressure vessel while reducing pressure within the sluice constructed in accordance with claim 1:
including mating wear elements in sliding engagement with one wear element located at the upper and lower edges of said edge members and another wear element embedded in said top and bottom sealing plates.

7. A cellular rotary sluice for discharging material from a pressure vessel while reducing pressure within the sluice constructed in accordance with claim 1:
wherein said outer seal elements include L-shaped rings supported at the edges of the outer vertical edge member.

8. A cellular rotary sluice for discharging material from a pressure vessel while reducing pressure with the sluice comprising in combination:
a cell housing rotatable about a vertical axis and having partially opened cells;
top and bottom sealing plates covering cells in the housing and for providing a material admission opening in the top plate and a material discharge opening in the bottom plate offset from the admission opening;
a vertical inner edge member of the housing in sealing relationship at an upper edge and a lower edge with the top plate and the bottom plate at an inner edge thereof;
an outer vertical edge member of the housing in sealing relationship at an upper and a lower edge with the top and bottom plates at an outer edge thereof;
an outer ring at the outer edge of the top plate and at the outer edge of the bottom plate;
first wear elements at the upper and the lower edge of each of the inner and outer vertical edge members;
embedded wear elements opposite the first wear elements and located in the top and bottom sealing plates;
and flexible seals outwardly of the wear elements at the upper and lower edge of the outer edge member between the outer rings and the outer edge member.

9. A cellular rotary sluice for discharging material from a pressure vessel while reducing pressure within the sluice constructed in accordance with claim 8:
wherein said flexible seals include an O-ring.

10. A cellular rotary sluice for discharging material from a pressure vessel while reducing pressure within the sluice constructed in accordance with claim 8:
wherein said flexible seals are compressed and are held compressed by a retaining compression ring.

11. A cellular rotary sluice for discharging material from a pressure vessel while reducing pressure with the sluice comprising in combination:
a cell housing rotatable about a vertical axis and having partially opened cells;
top and bottom plates of the housing covering cells in the housing for providing a material admission opening in the top plate and a material discharge opening in the bottom plate offset from the admission opening;
vertical inner and outer edge members of the housing in sealing relationship at an upper end with the top plate and a lower end with the bottom plate;
wear preventing elements at the upper and lower ends of said inner and outer edge members with mating wear preventing elements in the plates;
outer rings surrounding the outer vertical edge member;
a pressure seal between each outer ring and the vertical outer edge member outwardly of the wear elements;
and means for pressurizing the space between each outer ring and the wear preventing elements.

* * * * *